Oct. 16, 1945.  D. H. MITCHELL ET AL  2,386,906
TILTING APPARATUS
Filed Dec. 4, 1943
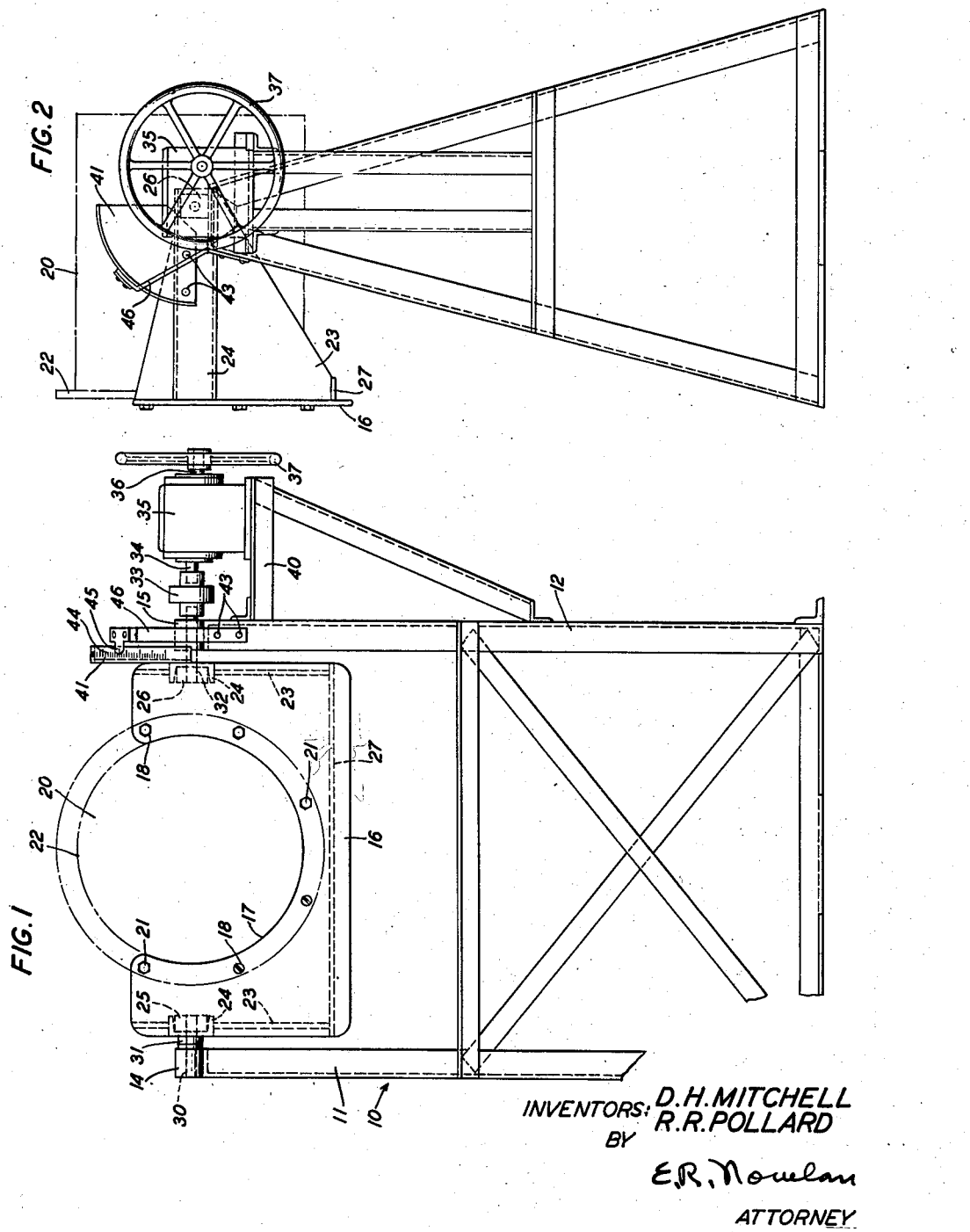
INVENTORS: D. H. MITCHELL
R. R. POLLARD
BY
E. R. Nowlan
ATTORNEY Patented Oct. 16, 1945

2,386,906

UNITED STATES PATENT OFFICE 2,386,906

TILTING APPARATUS

Donald H. Mitchell, Cranford, and Robert R. Pollard, East Orange, N. J., assignors to Western Electric Company, Incorporated, New York, N. Y., a corporation of New York Application December 4, 1943, Serial No. 512,948

2 Claims. (Cl. 248—13)

This invention relates to tilting apparatus, and more particularly to apparatus for tilting articles about a given axis.

An object of the invention is to provide a simple, efficient and practical apparatus for tilting articles.

With this and other objects in view, the invention comprises a support for an article mounted for movement about a given axis, with operable means to repeatedly move the support with the article about the axis and associated means to indicate the angular position of the center line of the article.

Other objects and advantages will be apparent from the following detailed description when considered in conjunction with the accompanying drawing, wherein Fig. 1 is a front elevational view of the apparatus, and Fig. 2 is a side elevational view of the apparatus.

Referring now to the drawing, a main frame is indicated generally at 10 and formed of suitable angle members and reenforcing strips, sides 11 and 12 of the frame being substantially triangular in general contour and having bearings 14 and 15 mounted upon the upper ends thereof. An article support 16 has an arcuate cutaway portion or opening 17 adjacent the edge of which is disposed a plurality of apertures 18. To this support an article 20 is secured through the aid of machine screws 21 or the like passing through the apertures 18 and connecting a flange 22, or the like, at the open end of the article 20. The exact structure of the article and the effect of the apparatus thereon cannot be defined due to the fact that, at the present time, the article is classified as secret under government regulation. It is important, however, to set forth that the center line of the article intersects the aligned center lines or axes of the shafts carrying the support 16 and that the said axes lie in a true horizontal plane. The support 16 includes side members 23 of the contours shown in Fig. 2, including therein channel members 24 and bearings 25 and 26. A horizontal member 27, fixed to the support 16 near the lower edge thereof, is connected to the sides 23 to complete the reenforcing and supporting means for the support 16.

A shaft 30, mounted in the bearing 14, extends through a spacing member 31 and into the bearing 25. In axial alignment with the shaft 30, a shaft 32 is disposed in and fixed to the bearing member 26, the shaft being supported rotatably by the bearing 15. A coupling 33 joins the outer end of the shaft 32 with an output shaft 34 of a speed reduction gear mechanism or unit 35. An input shaft 36 of the unit 35 has a hand wheel 37 mounted thereon and through the aid of which the unit may be operated to cause rotation of the shafts linked therewith to move the support 16 and the article about the axes of the shafts 30 and 32. The unit 35 is mounted upon an auxiliary frame 40 which is fixed to the side 12 of the main frame 10.

A dial 41, of the contour shown in Fig. 2, is fixed as at 43 to the channel member 24 and has indications 44 on its periphery representing degrees in both directions from a zero position. A pointer 45, mounted upon a bracket 46 fixed to the side 12 of the frame 10, is positioned to register with the indications 44 to indicate the distance or degrees the article has been moved from the zero position. When the zero indication on the dial registers with the pointer, then the center line of the article will lie in a true horizontal plane.

Upon considering the operation of the apparatus, let it be assumed that the article 20 is mounted upon the support 16. When in this position it will be known that the center line of the article intersects the axis about which the article will be moved. It will further be known that the center of gravity of the article is a given distance from the axis of the support but at a point in the center line of the article. Therefore, by rotating the hand wheel 37, the support 16 with the article 20 may be moved in either direction from the zero position to locate the article with its center line at a given angular position with respect to a true horizontal plane. This is made possible by the actuation of the mechanism in the unit 35, the rotation of the output shaft 34, the coupling 33, and the shaft 32. The amount of this movement in either direction may be visualized and determined through the aid of the pointer 45 and the indications on the dial 41. Furthermore, the unit 35 is adapted to hold the support 16 with the article 20 locked in any of the positions, the output shaft 34 thereof being actuated only by actuation of the wheel 37.

It is realized that the purpose and function of the apparatus could be made clearer if it were possible to reveal the inner structure of the article and the necessity of mounting the article in a known position and moving it into various other known positions. Perhaps it would be helpful to state that a certain mechanism is housed in the article and, due to the various positions in which the article may be disposed, it is important to know that the mechanism will be efficient when the article is in any and all of the said positions.

Although specific improvements of the invention have been shown and described, it will be understood that they are but illustrative and that various modifications may be made therein without departing from the scope and spirit of this invention as defined by the appended claims.

What is claimed is:

1. A tilting apparatus for a hollow article having an open end, the apparatus comprising a supporting frame, an element having an opening therein conforming to the open end of the article, means carried by the frame for supporting the element for movement about a given axis, means carried by the support to secure the open end of the article thereto at the said opening and with the center line of the article intersecting the said axis, and means operatively connected to the element to move the element with the article into a plurality of positions about the axis.

2. A tilting apparatus for a hollow article having an open end with an integral flange at the open end and spaced apertures in the flange, the apparatus comprising a supporting frame, an element having an opening therein conforming to the open end of the article and adjacent apertures positioned to register with the said apertures in the flange of the article, means carried by the frame for supporting the element for movement about a given axis, means disposed in the said apertures of the element and the flange of the article to secure the open end of the article to the support at the said opening and with the center line of the article intersecting the said axis, a driving member, and a speed reducing unit interposed between the driving member and the element to cause movement of the element with the article into a plurality of positions about the axis.

DONALD H. MITCHELL.
ROBERT R. POLLARD.